US010002468B2

(12) United States Patent
Hamilton (10) Patent No.: US 10,002,468 B2
(45) Date of Patent: Jun. 19, 2018

(54) SYSTEMS AND METHODS FOR UPDATING NON-NETWORKED AUTONOMOUS DEVICES

(71) Applicant: Echostar Technologies L.L.C., Englewood, CO (US)

(72) Inventor: Darren Hamilton, Castle Rock, CO (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 0 days. days.

(21) Appl. No.: 15/255,577

(22) Filed: Sep. 2, 2016

(65) Prior Publication Data

US 2018/0068494 A1  Mar. 8, 2018

(51) Int. Cl.
*G07C 5/00* (2006.01)
*H04B 7/185* (2006.01)
(Continued)

(52) U.S. Cl.
CPC .............. *G07C 5/008* (2013.01); *B60L 8/003* (2013.01); *B60L 11/1846* (2013.01); *B64F 5/40* (2017.01);
(Continued)

(58) Field of Classification Search
CPC combination set(s) only.
See application file for complete search history.

(56) References Cited

U.S. PATENT DOCUMENTS 5,646,845 A  7/1997 Gudat et al.
6,647,328 B2  11/2003 Walker
(Continued)

FOREIGN PATENT DOCUMENTS

CN  103 533 041 A  1/2014
EP  2840022 A1  2/2015
(Continued)

OTHER PUBLICATIONS

Simic et al., "Investigation in wireless power transmission for UAV charging," Procedia Computer Science vol. 60 (2015) pp. 1846-1855, 19th International Conference on Knowledge Based and Intelligent Information and Engineering Systems, www.sciencedirect.com.
(Continued)

*Primary Examiner* — Angela Y Ortiz
*Assistant Examiner* — Edward J Pipala
(74) *Attorney, Agent, or Firm* — Kilpatrick Townsend & Stockton (57) ABSTRACT

Various arrangements for servicing autonomous devices via satellite-based communication links are detailed herein. A satellite transponder stream of data may be monitored via a tuner for an identifier indicative of an autonomous device. An update linked with the identifier may be acquired from the satellite-transmitted transponder stream of data. The acquired update may be stored at least until the autonomous device communicatively pairs with the network-independent maintenance device. The autonomous device may be communicatively paired with the system or device that received the satellite-broadcast update. In response to having acquired the update linked with the identifier from the transponder stream of data and the autonomous device being communicatively paired with the system or device, the acquired update may be transmitted to the autonomous device.

20 Claims, 6 Drawing Sheets

(51) Int. Cl.
  *H02J 7/00* (2006.01)
  *H02J 7/35* (2006.01)
  *H02S 40/38* (2014.01)
  *B60L 11/18* (2006.01)
  *B60L 8/00* (2006.01)
  *B64F 5/40* (2017.01)

(52) U.S. Cl.
  CPC ............ *G07C 5/006* (2013.01); *H02J 7/0021* (2013.01); *H02J 7/35* (2013.01); *H02S 40/38* (2014.12); *H04B 7/185* (2013.01); *B60L 2230/16* (2013.01); *H02J 2007/0096* (2013.01)

(56) References Cited

U.S. PATENT DOCUMENTS

| | | | |
|---|---|---|---|
| 7,856,294 | B2 | 12/2010 | Van Gaasbeck et al. |
| 7,856,629 | B2 | 12/2010 | Van Gaasbeck et al. |
| 8,391,375 | B2 | 3/2013 | Sammel, Jr. et al. |
| 8,588,830 | B2 | 11/2013 | Myer et al. |
| 2010/0269143 | A1 | 10/2010 | Rabowsky |
| 2014/0266674 | A1 | 9/2014 | Nye et al. |
| 2015/0215670 | A1 | 7/2015 | Patel et al. |
| 2016/0070261 | A1 | 3/2016 | Heilman et al. |
| 2016/0147223 | A1* | 5/2016 | Edwards ............... G05D 1/0027 701/2 |
| 2016/0244187 | A1* | 8/2016 | Byers .................... B64C 39/024 |
| 2016/0364989 | A1* | 12/2016 | Speasl .................. G08G 5/0034 |
| 2017/0069214 | A1* | 3/2017 | Dupray ................. G08G 5/0021 |
| 2017/0086011 | A1* | 3/2017 | Neves ................... H04W 4/005 |
| 2017/0097639 | A1* | 4/2017 | Edwards ............... G05D 1/0027 |
| 2017/0118599 | A1* | 4/2017 | Cabral .................. H04W 4/046 |
| 2017/0129603 | A1* | 5/2017 | Raptopoulos ......... B64C 39/024 |

FOREIGN PATENT DOCUMENTS

| | | |
|---|---|---|
| WO | 2009045213 A1 | 4/2009 |
| WO | 2015/073687 A1 | 5/2015 |

OTHER PUBLICATIONS

International Search Report and Written Opinion for PCT/US2017/049701 dated Nov. 20, 2017, all pages.

* cited by examiner

SYSTEMS AND METHODS FOR UPDATING NON-NETWORKED AUTONOMOUS DEVICES

CROSS-REFERENCES TO RELATED APPLICATIONS

This Application is related to U.S. patent application Ser. No. 15/255,823, entitled "Systems and Methods for Satellite-based On-board Autonomous Device Deactivation", filed on the same day as this Application, the entire disclosure of which is hereby incorporated by reference for all purposes.

BACKGROUND

Autonomous devices, which can include unmanned aerial vehicles (UAVs), may operate in remote locations. In such locations, access to the Internet may be slow, intermittent, or entirely unavailable. Despite the limitations placed on communication, maintaining control and ensuring the safety of the autonomous device, members of the public, and property located in the vicinity of where the autonomous device functions may be necessary.

SUMMARY

Various arrangements involving devices for servicing autonomous devices are detailed. A network-independent maintenance device may retrieve or access an identifier indicative of the autonomous device maintained by the network-independent maintenance device. The network-independent maintenance device may monitor a transponder stream for the identifier indicative of the autonomous device. The network-independent maintenance device may acquire an update linked with the identifier from the transponder stream received via a tuner of the network-independent maintenance device. causing, by the network-independent maintenance device, the acquired update to be stored locally in a memory at least until the autonomous device communicatively pairs with the network-independent maintenance device. The network-independent maintenance device and the autonomous device may communicatively pair. In response to having acquired the update linked with the identifier from the transponder stream and the autonomous device being communicatively paired with the network-independent maintenance device, the network-independent maintenance device may transfer the acquired update to the autonomous device.

Various arrangements involving such a network-independent maintenance device may include one or more of the following features: While the network-independent maintenance device and the autonomous device are communicatively paired, the network-independent maintenance device may charge a battery of the autonomous device. Acquiring the update linked with the identifier from the transponder stream received by the tuner may include filtering the update from a plurality of updates broadcast for a plurality of autonomous devices. The network-independent maintenance device may transmit to a remote computer system, an indication of the update having been transferred to the autonomous device, wherein the indication indicates: the acquired update and the autonomous device. Monitoring the transponder stream may include monitoring the transponder stream for a plurality of identifiers comprising the identifier, wherein each identifier of the plurality of identifiers is associated with a different autonomous device maintained by the network-independent maintenance device. The network-independent maintenance device may receive an instruction addressed to the network-independent maintenance device via the tuner. The instruction may provide a second identifier indicative of a second autonomous device maintained by the network-independent maintenance device. The network-independent maintenance device may store the second identifier to the local memory. The network-independent maintenance device may initiate monitoring of the transponder stream for the second identifier. The network-independent maintenance device may pair with a second autonomous device, wherein communicatively pairing with the second autonomous device comprises the second autonomous device providing a second identifier to the network-independent maintenance device. In response to receiving the second identifier from the second autonomous device: the second identifier may be stored by the network-independent maintenance device and monitoring of the transponder stream for the second identifier may be initiated.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Autonomous devices (ADs), referring to devices that at least for a time can operate independently of user control, such as unmanned aerial vehicles (UAVs) and unmanned ground vehicles (UGVs), and mobile autonomous robotic units (e.g., humanoid bipedal or otherwise self-propelled) may operate in remote locations in which access to the Internet is not readily available or access is not available at a sufficient bandwidth. Despite such difficulty in communicating via the Internet, such ADs may need to be updated and recharged periodically via the embodiments detailed herein. Updates can include software updates, firmware updates, rule updates, database updates, instruction updates, map updates, waypoint updates, or any other form of update data that can be transferred digitally to an AD. Rather than relying on Internet connectivity to perform such updates, a satellite communication platform that periodically broadcasts updates may be used to send updates to maintenance devices that locally communicates and optionally recharges autonomous devices. The updates transmitted via the satellite platform may be specific to individual autonomous devices or may be applicable to multiple ADs. For example, an update to all ADs of a specific type, make, and model may be broadcast via the satellite platform. A return satellite stream can be used to provide the AD's state of health to the device's operator or manufacturer, enabling the ADs to request service if one of its subsystems are not operating properly. Further, such an arrangement can help increase security of the ADs because access to the AD via the Internet may be unavailable.

A network-independent maintenance device (MDs for short) may monitor one or more transponder feeds for one or more particular identifiers. The identifier for which the MD monitors may be indicative of a specific AD or type/make/model of AD that has previously or is expected to visit or reside at the MD. When the MD identifies the identifier in one of the transponder streams, the MD may acquire, record, and store the update broadcast via the transponder stream. When the AD communicatively links with the MD at some later time, the update may be provided to the AD by the MD. At the same time (or immediately following or preceding) the MD may recharge a power source of the AD. If the MD is powered by a sustainable off-grid power source, such as a solar array, and has a functioning satellite downlink, the MD may be able to recharge and update one or more ADs indefinitely.

Additional detail regarding the embodiments of the network-independent maintenance devices and the satellite-based platform used to provide the updates to the ADs is detailed in relation to FIGS. 1-6.

Figure 1:
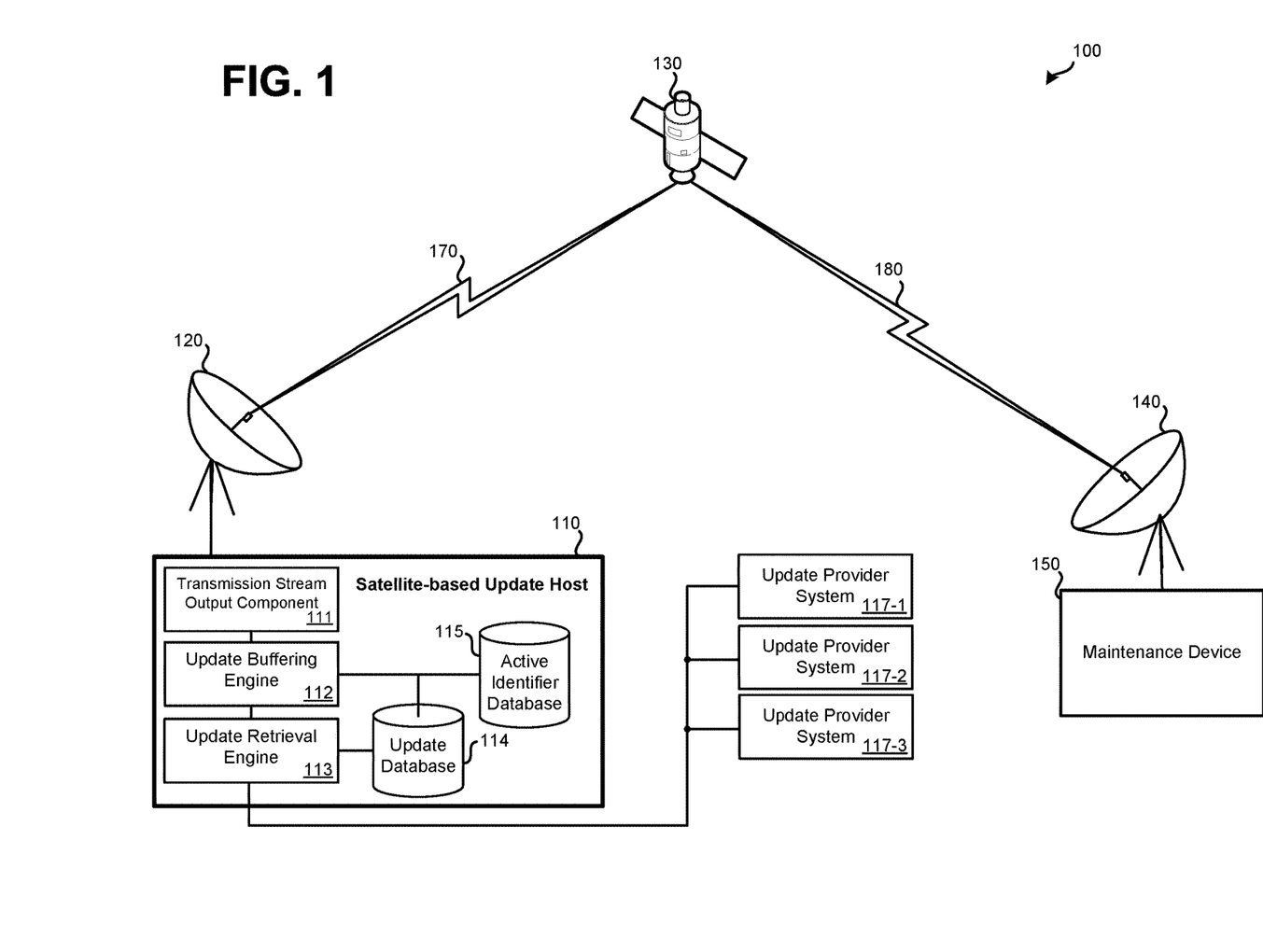
FIG. 1 illustrates an embodiment of a satellite-based distribution system for distributing updates.

FIG. 1 illustrates an embodiment of a satellite-based distribution system 100 for distributing updates. Satellite-based distribution system 100 may include: satellite-based update host 110, satellite transmitter equipment 120, satellite 130, satellite antenna 140, network-independent maintenance device (MD) 150, and update provider systems 117. Alternate embodiments of satellite-based distribution system 100 may include fewer or greater numbers of components. While only one satellite antenna 140 and MD 150 are illustrated, it should be understood that multiple (e.g., tens, thousands, millions of) instances of such equipment may receive update streams from satellite-based update host 110 via satellite 130.

Satellite-based update host 110 may include transmission stream output component 111, update buffering engine 112, update retrieval engine 113, update database 114, and active identifier database 115. Active identifier database 115 may store identifiers that are associated with ADs that are to receive updates. In order for an update to be periodically transmitted to various MDs, the identifier associated with the AD may be required to be indicated as active in active identifier database 115. Various makes and models of ADs may be assigned and linked with a unique identifier (which is unique from other identifiers used by satellite-based update host 110). A user or operator of satellite-based update host 110 may add an identifier to active identifier database 115 if the user or operator desires updates associated with that particular identifier to be broadcast to MDs.

For ADs that are associated with an active identifier in active identifier database 115, update retrieval engine 113 may periodically check for and/or be pushed updates from update provider systems 117. Update provider systems 117 may represent various sources from which updates may be acquired. As an example, update provider system 117-1 may be operated by a manufacturer of UAVs. Update provider system 117-1 may occasionally offer software and/or firmware updates for particular makes and models of UAVs manufactured by the manufacturer that operates update provider system 117-1. Update retrieval engine 113 may retrieve such updates after they become available, may associate the update with the appropriate identifier from active identifier database 115, and may store the update in update database 114. As illustrated, multiple update provider systems are illustrated, including update provider system 117-2 and update provider system 117-3. Such update provider systems may be accessible by update retrieval engine 113 via a network such as the Internet. Whether update retrieval engine 113 retrieves updates or is pushed updates, such updates may be stored in update database 114. While update provider systems 117 may provide software and/or firmware updates that can be used to update many ADs, an update provider system may also provide an update that is specific to a particular AD. For example, an update may be a specific set of waypoints or operating instructions that are only to be implemented by a particular AD. While three update provider systems are illustrated, such a number is merely an example, fewer or greater numbers of update provider systems may be in communication with update retrieval engine 113.

Update buffering engine 112 may create a buffer of updates to be broadcast to MDs. Update buffering engine 112 may retrieve updates from update database 114 that correspond to active identifiers in active identifier database 115. For example, a firmware update that corresponds to a particular make and model of UAV may be retrieved by update buffering engine 112 from update database 114 once per day for broadcast. The frequency at which any particular update is transmitted may be determined based on various factors including how likely useful the update is, the urgency of the update, requests from users, and/or how recent the update is (newer updates may be transmitted more frequently). As such, some updates may be streamed more frequently than other updates. In some embodiments, update buffering engine 112 may rotate between all updates available in update database 114 that are associated with active identifiers in active identifier database 115.

The buffer of updates created by update buffering engine 112 may be streamed for broadcast by transmission stream output component 111. Transmission stream output component 111 may serve to format the updates into a form appropriate for transmission by satellite transmitter equipment 120. In some embodiments, this may include associating the appropriate identifier from active identifier database 115 with the update from update database 114, and performing any encryption and/or scrambling necessary to protect content of the update.

Satellite 130 may be configured to receive signals, such as streams of software and firmware updates, from one or more satellite uplinks such as satellite transmitter equipment 120. Satellite 130 may relay received signals from satellite transmitter equipment 120 (and/or other satellite transmitter equipment) to multiple instances of MDs via transponder streams, such as using the $K_A$ or $K_U$ bands. Different frequencies may be used for uplink signal 170 from downlink transponder stream 180. Satellite 130 may be in geosynchronous orbit. Each of the transponder streams transmitted by satellite 130 may contain multiple streams of update data transmitted as packetized data. For example, a single transponder stream may be a serial digital packet stream with a single satellite transmitting multiple transponder streams of data. Multiple satellites may be used to relay update data from satellite-based update host 110 to various instances of MDs, such as satellite antenna 140 and MD 150. Therefore, different update streams may be transmitted via different satellites in various embodiments.

Satellite antenna 140 may be a piece of user equipment that is used to receive transponder streams from one or more satellites, such as satellite 130. Satellite antenna 140, which may include one or more low noise blocks (LNBs), may be configured to receive transponder streams from multiple satellites and/or multiple transponders of the same satellite. The antenna may be tunable to be able to receive transponder streams on multiple frequencies. For example, a tuner of MD 150 may only be able to tune to a single transponder stream from a transponder of a single satellite at a given time. The tuner can then be re-tuned to another transponder of the same or a different satellite. MD 150 having multiple tuners may allow for multiple transponder streams to be received at the same time.

Figure 2:
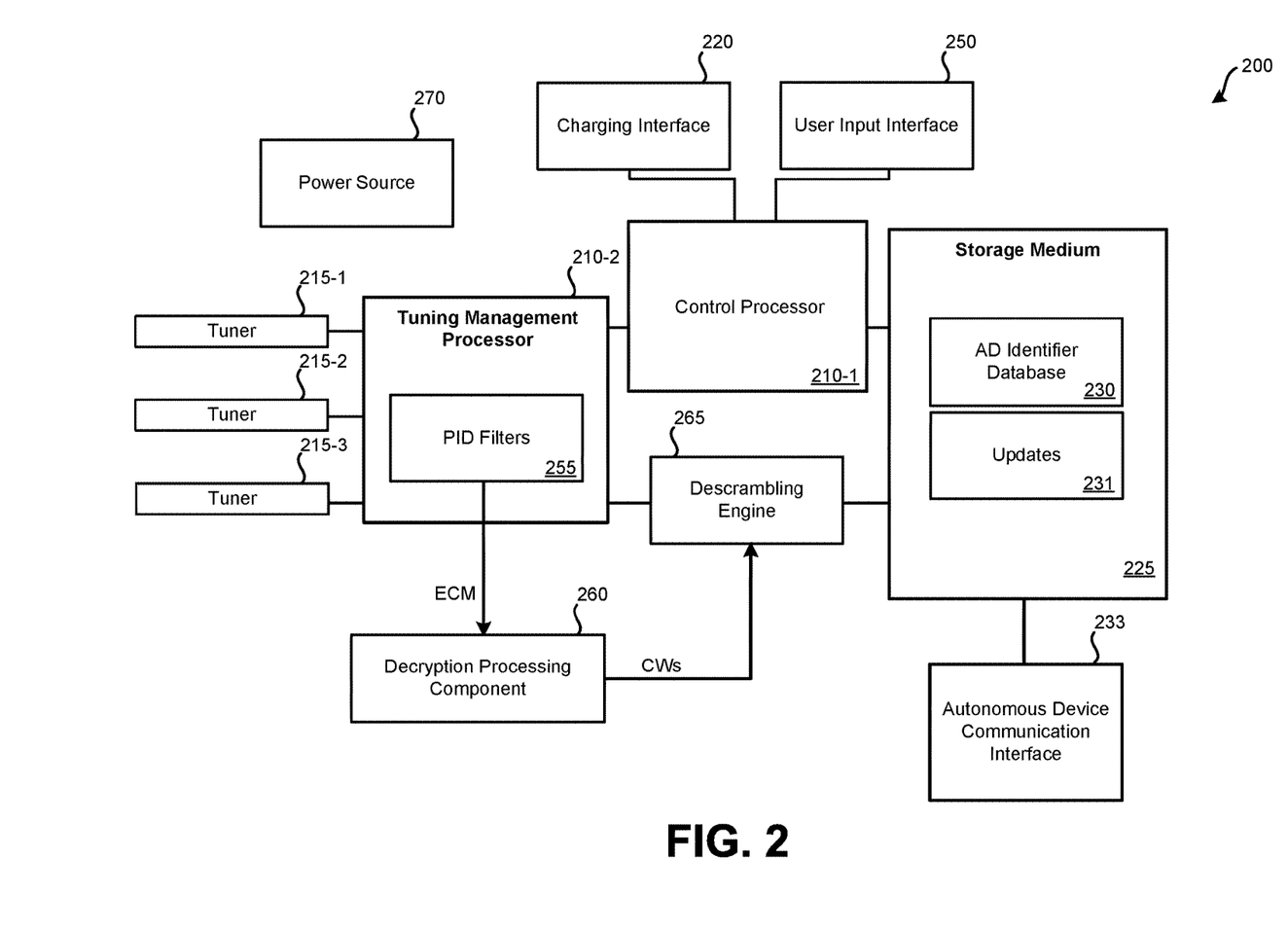
FIG. 2 illustrates an embodiment of a network-independent maintenance device that can receive updates via satellite.

In communication with satellite antenna 140 may be one or more MDs, such as MD 150. MD 150 may be configured to decode signals received from satellite 130 via satellite antenna 140 for analysis, storage, and eventual distribution to one or more ADs. FIG. 2 provides additional detail of various embodiments of MD 150.

Uplink signal 170 represents a signal between satellite transmitter equipment 120 and satellite 130. It should be understood that multiple uplink signals may be present. Each uplink signal may contain one or more update streams. For example, uplink signal 170 may be used to stream updates for UAVs while a second uplink signal may be used to stream updates for UGVs. In some embodiments, the update streams may be at least partially encrypted and/or scrambled.

Downlink transponder stream 180 represents a transponder stream signal between satellite 130 and satellite antenna 140 (and, since it is a broadcast, potentially many other satellite antennas connected with MDs). Transponder stream 180 may represent a relayed version of uplink signal 170, possibly being transmitted at a different frequency than at which uplink signal 170 was received.

FIG. 2 illustrates an embodiment of a network-independent maintenance device 200 that can receive updates via satellite. Network-independence refers to the concept that the MD may not be connected with the Internet and/or may not be able to transmit data to a host system, but rather may only be able to receive data from the host system. The various components of MD 200 may be housed inside a housing. MD 200 may include: processors 210 (which may include control processor 210-1, tuning management processor 210-2, and possibly additional processors), tuners 215 (which may be in electrical communication with a satellite antenna, such as satellite antenna 140 of FIG. 1), charging interface 220, non-transitory computer-readable storage medium 225, AD identifier database 230, updates 231, user input interface 250, decryption processing component 260 (which can be in the form of a removable or non-removable smartcard), descrambling engine 265, and autonomous device communication interface 233. In other embodiments of MD 200, fewer or greater numbers of components may be present. It should be understood that the various components of MD 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID (packet identifier) filters 255 may be handled by separate hardware from program management table 257.

Processors 210 may include one or more specialized and/or general-purpose processors configured to perform processes such as tuning to a particular transponder stream, and receiving and processing input from a user. For example, processors 210 may include one or more processors dedicated to decode data and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may provide commands to tuning management processor 210-2 to select a particular transponder stream from a particular satellite for tuning.

Tuners 215 may include one or more tuners used to tune to transponder streams that include software updates, firmware updates, or other forms of updates. In the illustrated embodiment of MD 200, three tuners are present (tuner 215-1, tuner 215-2, and tuner 215-3). In other embodiments, two or more than three tuners may be present, such as four, six, or eight tuners. Each tuner contained in tuners 215 may be capable of receiving and processing a single transponder stream from a satellite transponder at a given time. As such, a single tuner may tune to a single transponder stream at a given time. If tuners 215 include multiple tuners, one tuner may be used to tune to a transmitted stream of updates on a first transponder stream, while another tuner may be used to tune to a second stream of updates transmitted on a second transponder stream. Tuners 215 may receive commands from tuning management processor 210-2. Such commands may instruct tuners 215 which frequencies or transponder streams to tune.

Storage medium 225 may represent one or more non-transitory computer-readable storage mediums. Storage medium 225 may include memory and/or a hard drive. Storage medium 225 may be used to store information received from one or more satellites. Storage medium 225 may store information related to AD identifier database 230 and updates 231.

AD identifier database 230 may store indications of the identifiers associated with ADs for which MD 200 has previously or is expected to provide updates to. An identifier may be added to AD identifier database 230 in multiple ways. First, a user may directly program in an identifier via user input interface 250. In some embodiments, a user may select a type/make/model of an AD and MD 200 may locally look up an identifier associated with the AD. That is, the MD may have a locally-stored table that associates various ADs with identifiers. In some embodiments, an AD's identifier is added to AD identifier database 230 in response to the AD pairing with the MD. The identifier associated with the AD may then be maintained in AD identifier database 230 for at least a defined period of time. The identifier may be removed after a defined period of time, such as one month, in the absence of the AD communicatively pairing with MD 200. In some embodiments, an instruction addressed to MD 200 may be received via tuners 215 from satellite-based update host 110. The instruction, which may be ignored by other MDs, may instruct MD 200 on an identifier to add or remove from AD identifier database 230. In some embodiments, rather than an identifier being added or deleted, an identifier may be activated or inactivated, such as by designating the identifier is active via an associated flag in AD identifier database 230. Table 1 represents an example set of entries in AD identifier database 230.

TABLE 1

| AD | Identifier | Last Pair | Active Flag |
| --- | --- | --- | --- |
| Acme Corp. UAV 2000 | 234832948 | Apr. 27, 2016 6:13 PM | Yes |
| Acme Corp. UGV 34943 | 909854304 | Feb. 1, 2016 2:15 AM | No |
| Monolith Sunsetter 3994 | 003428923 | None | Yes |
| Eastland UAV 23033 | 898978232 | Aug. 12, 2016 2:22 PM | Yes |

Updates 231 can represent stored firmware, software, or other digital updates to be provided or installed on an AD. Updates 231 may be stored using storage medium 225 from the time such updates are received via tuners 215 until after successful transfer of the update to the associated AD. If a more recent version of an update is received via tuners 215 before a previous version of the update is transmitted to or installed on the associated AD, the previous version of the update may be deleted from updates 231 and replaced with the newer version.

Referring back to tuners 215, update data streams received via satellite may contain at least some scrambled data. Packets of data may be scrambled to prevent unauthorized devices from receiving updates without, for example, paying a subscription fee. When a tuner of tuners 215 is receiving data from a particular transponder of a satellite, the transponder stream may be a series of data packets corresponding to one or more updates. Each data packet may contain a packet identifier (PID), which may correspond to an identifier stored in AD identifier database 230. Particular data packets, referred to as entitlement control messages (ECMs), may be periodically transmitted. ECMs may be associated with another PID and may be encrypted; MD 200 may use decryption engine 261 of decryption processing component 260 to decrypt ECMs. Decryption of an ECM may only be possible if MD 200 has authorization to access the particular data stream or a particular update. When an ECM is determined to correspond to an update to be acquired by MD 200, the ECM may be provided to decryption processing component 260 for decryption.

When decryption processing component 260 receives an encrypted ECM, decryption processing component 260 may decrypt the ECM to obtain some number of control words. In some embodiments, from each ECM received by decryption processing component 260, two control words are obtained. In some embodiments, when decryption processing component 260 receives an ECM, it compares the ECM to the previously received ECM. If the two ECMs match, the second ECM is not decrypted because the same control words would be obtained. In other embodiments, each ECM received by decryption processing component 260 is decrypted; however, if a second ECM matches a first ECM, the outputted control words will match; thus, effectively, the second ECM does not affect the control words output by decryption processing component 260. Decryption processing component 260 may be permanently part of MD 200 or may be configured to be inserted and removed from MD 200.

Tuning management processor 210-2 may be in communication with tuners 215 and control processor 210-1. Tuning management processor 210-2 may be configured to receive commands from control processor 210-1. Such commands may indicate when to start or stop receiving a particular transponder stream. Tuning management processor 210-2 may control tuners 215. Tuning management processor 210-2 may provide commands to tuners 215 that instruct the tuners to which satellite, transponder, and/or frequency to tune. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created. The PID filter created may be based on one or more identifier stored by AD identifier database 230. That is, a PID filter may be created that corresponds to an identifier for an AD that is to be maintained using MD 200. A separate PID filter may be created for each identifier. A same PID filter may capture an update that can be used to update multiple ADs (e.g., ADs of the same make/model).

PID filters 255 may be configured to filter data packets received as part of a transponder stream based on PIDs. A transponder data stream includes multiple streamed updates; data packets corresponding to an update that is not needed for an AD maintained by MD 200 (that is, a corresponding identifier is not present or active in AD identifier database 230) may be ignored by PID filters 255. As such, only data packets corresponding to the one or more updates desired to be stored may be passed to either descrambling engine 265 or decryption processing component 260, or stored to the storage medium; other data packets may be ignored.

Descrambling engine 265 may use the control words output by decryption processing component 260 in order to descramble data corresponding to updates for storage. Update data contained in the transponder data stream received by tuners 215 may be scrambled. Update data may be descrambled by descrambling engine 265 using a particular control word. Which control word output by decryption processing component 260 to be used for successful descrambling may be indicated by a scramble control identifier present within the data packet containing the scrambled data. Descrambled data may be output by descrambling engine 265 to storage medium 225 for storage (in updates 231).

AD communication interface 233 may establish either a wired or wireless communication link with an MD. AD communication interface 233 may use protocols such as IEEE's 802.11 standard, WiFi Direct®, Bluetooth®, or some other short or long range wireless communication protocol. Wired communication protocols may also be used, such as Ethernet, USB, or other serial or parallel interfaces and may require encrypted communication. For a wired connection to be established between MD 200 and an AD, various arrangements may be used. For example, U.S. patent application Ser. No. 15/228,672, entitled "Midair Tethering of an Unmanned Aerial Vehicle with a Docking Station," filed Aug. 4, 2016, which is hereby incorporated by reference for all purposes, details various arrangements of how a UAV (which can be a form of AD) can be tethered to a docking station, such as MD 200. Once a communication link is established between an AD and MD 200, AD communication interface 233 may request or may receive an identifier of the AD from the AD. This identifier may match an identifier stored in AD identifier database 230 or may be otherwise linked with such an identifier. Control Processor 210-1 may determine that the AD that has established a communication link with AD communication interface 233 has an associated update stored by storage medium 225. This update may be transmitted to or installed on the AD via AD communication interface 233. Once successfully transmitted or installed, the update may be deleted from updates 231. MD 200 may maintain a log on storage medium 225 of when updates were provided to ADs, the AD which received the update, the time and date of the update, etc.

Before, during, or after an update is provided to an AD or, during a session in which no update is to be provided to the AD, charging interface 220 may provide power from MD 200 to the AD. Charging interface 220 may provide power via a wired or wireless power link. A wired link may be established in a similar manner as for a wired communication link as detailed in relation to AD communication interface 233 depending on the AD requirements. A combined data and power link can also be utilized based on MD design. MD 200 may have one or more batteries that service as primary or backup power source 270. Power from power source 270 may power components of MD 200 and may be supplied to the AD via charging interface 220. In some embodiments, MD 200 is connected with a power grid, which may negate the need for MD 200 having one or more batteries. If MD 200 is off a power grid (e.g., in a remote location), an alternate power source, such as a solar array, may charge one or more batteries of MD 200.

User input interface 250 may allow a user to provide input to MD 200. For instance, user input interface 250 may include a keyboard, keypad, touchscreen, or some other form of user-input device. In some embodiments, user input interface 250 may allow another device, such as a tablet computer or mobile device to communicate with and provide user input to MD 200.

For simplicity, MD 200 of FIG. 2 has been reduced to a block diagram; commonly known parts, such as a housing which may house the components of MD 200, have been omitted. Further, some routing between the various modules of MD 200 has been illustrated. Such illustrations are for exemplary purposes only. The state of two modules not being directly or indirectly connected does not indicate the modules cannot communicate. Rather, connections between modules of the MD 200 are intended only to indicate possible data routing. It should be understood that the modules of MD 200 may be combined into a fewer number of modules or divided into a greater number of modules. MD 200 may include one or more instances of various computerized components, such as disclosed in relation to computer system 900 of FIG. 9.

Figure 3:
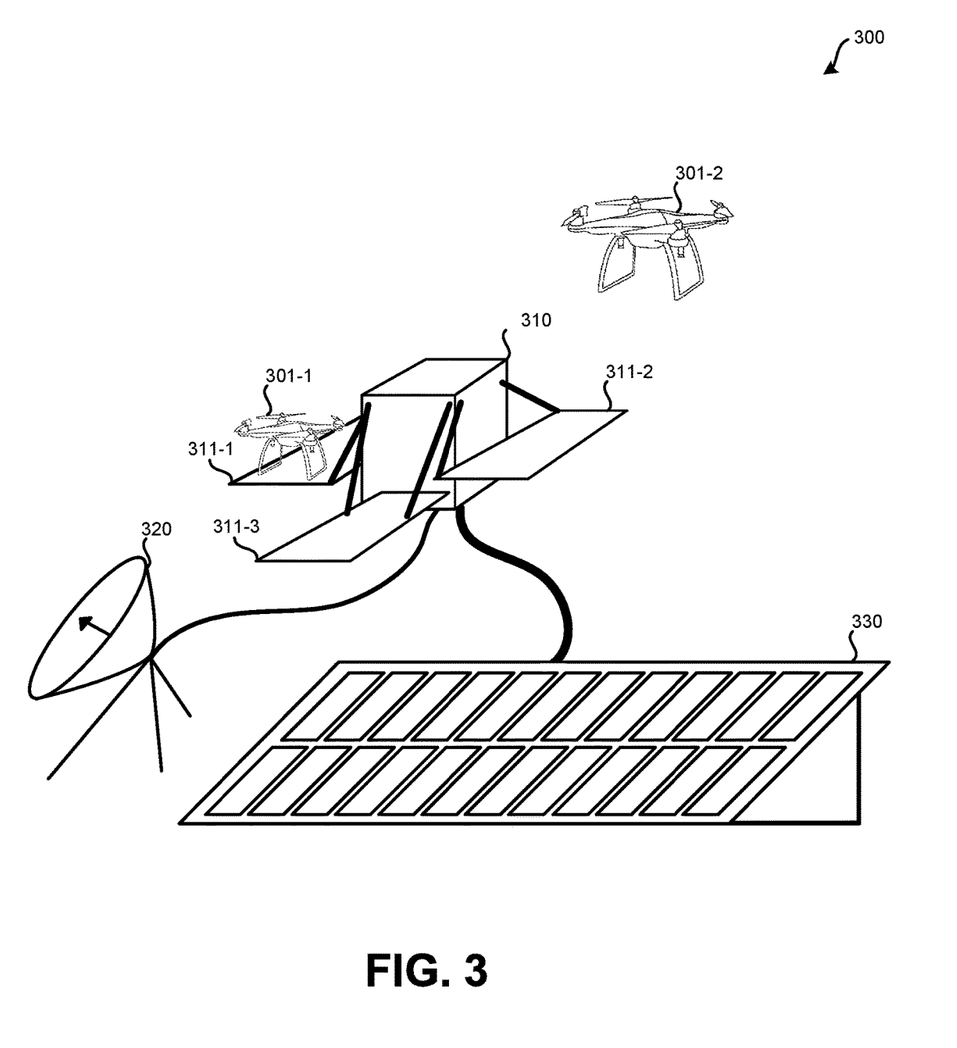
FIG. 3 illustrates an embodiment of a network-independent maintenance device.

FIG. 3 illustrates an embodiment 300 of a network-independent maintenance device 310. MD 310 includes multiple docking platforms 311 (311-1, 311-2, and 311-3), on which ADs such as UAVs 301-1 and 301-2 may land, receive updates, and/or recharge one or more batteries of the UAVs 301. It should be understood that having three docking platforms 311 is merely exemplary; more or fewer docking platforms may be present in other embodiments or other arrangements for docking may be incorporated as part of MD 310. For instance a UGV that is to be recharged wirelessly and uses wireless communication may need to drive within a defined distance of MD 310 to receive an update and recharge its batteries. While docking platforms 311 are illustrated as cantilevered from a housing of MD 310, it should be understood that such docking platforms may be arranged differently in other embodiments.

In the illustrated embodiment 300, UAV 301-1 has landed on docking platform 311-1 and is receiving an update and recharging one or more batteries of UAV 301-1. UAV 301-2 may be in the process of taking off from docking platform 311-3 after receiving a recharge and update.

In the illustrated embodiment 300, MD 310 is powered by solar array 330. Therefore, solar array 330 is used to power internal components of MD 310, charge one or more batteries of MD 310, and provide power for recharging to UAVs 301 and any other ADs which may receive power from MD 310. Satellite antenna 320 allows for update data transponder streams to be received by one or more tuners of MD 310. Componentry of MD 310 may be as detailed in relation to MD 200 of FIG. 2.

Figure 4:
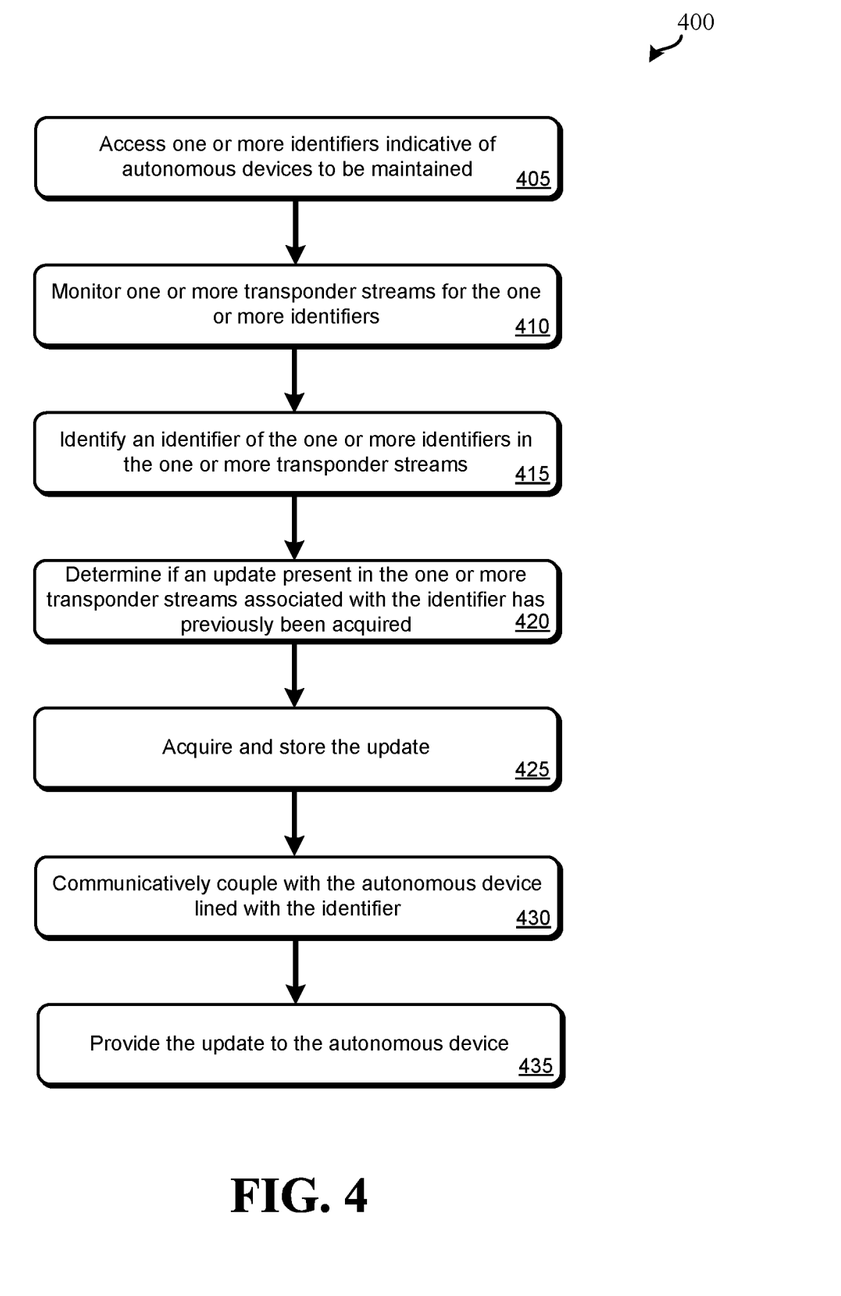
FIG. 4 illustrates an embodiment of a method for updating software of autonomous device using a network-independent maintenance device.

The embodiments of FIGS. 1-3 may be used to perform various methods for updating software of an autonomous device using a network-independent maintenance device. FIG. 4 illustrates an embodiment of a method 400 for updating software of an autonomous device using a network-independent maintenance device. Method 400 may be performed using the systems and devices of FIGS. 1 through 3. Specifically, each block of method 400 may be performed by an MD, such as MD 200 of FIG. 2 that is functioning as part of a system, such as system 100 of FIG. 1.

At block 405, one or more identifiers that are indicative of one or more ADs that are to be maintained by an MD may be accessed by the MD. These identifiers may be stored locally by the MD using a storage device. The identifiers accessed at block 405 may be used to determine what data from one or more update data streams received from a satellite may be stored by the MD and what data should be discarded. It can be expected that a vast majority of the data broadcast via the transponder stream and received by the MD may be discarded as most updates may pertain to ADs that are not maintained using the MD.

At block 410, one or more transponder streams may be monitored by the MD for the one or more identifiers accessed at block 405. Block 410 can include monitoring the transponder streams for an update software package, update firmware package, or other update data that is broadcast and is associated with one of the identifiers accessed at block 405. In some embodiments, a defined time period may be associated with particular identifiers. The MD may store an indication of the defined time period. Therefore, the MD may only need to monitor the one or more transponder streams during defined particular periodic time periods for updates. If the update is not received via the satellite broadcast during the defined time period, no update is available. For example, a most-recent update for a particular make and model of UAV may be transmitted on Mondays between 2-4 PM. As such, if the MD is monitoring for only an identifier associated with this make and model UAV, the one or more tuners of the MD may only need to be tuned to the one or more transponder streams (or the particular transponder stream on which the update is scheduled to be transmitted) during the predefined time period.

At block 415, the MD may identify an identifier of the one or more identifiers in the one or more transponder streams being monitored. At block 420, a determination may be performed if the update associated with the identifier identified in the one or more transponder streams at block 415 has already been received and successfully stored. This determination may be based on a version number of the update indicated in the transponder stream and a version number maintained by the MD for a previous update successfully stored locally and/or already successfully transmitted by the MD to the AD. For example, referring to AD identifier database 230, a version number may be stored in association with each identifier within the database. This version number may indicate the most recent update either stored locally in updates 231 or provided to one or more ADs via AD communication interface 233.

At block 425, assuming the update at block 420 has been determined to have not been previously acquired or has not already been provided to the associated ADs maintained by the MD, the update may be acquired and stored locally by the MD. As such, the MD has acquired the update to be provided to the AD without communicating with the satellite-based update host via the Internet or any other terrestrial, bidirectional communication network. Rather, all the information required to provide the update to the AD by the MD has been received via a broadcast done via satellite by a satellite-based update host and this broadcast may be unidirectional. That is, the satellite antenna may not be able to transmit data back to the satellite-based update host, such as if certain $K_U$ frequencies are used. Some $K_U$ frequencies and $K_A$ can be capable of bi-directional communication. It should be understood that the same update received and stored at block 425 may be received and stored by MDs located in other locations if such other MDs also maintain ADs associated with the same identifier (e.g., ADs that are of the same make and model). In some situations, an update may be addressed to a particular AD or MD and thus may only be stored for eventual transmission by a particular MD.

At some time later, the AD may communicatively couple with the MD at which the update was acquired and stored at block 425. The amount of time that may elapse between blocks 425 and block 430 may vary significantly. For example, some ADs may only visit or reside at their respective MD once per day, once per week, or once per month. Other ADs may frequently visit or reside at their associated MD; for example, an AD may only typically be away from its MD for periods of several minutes. At block 430, when the AD communicatively couples with the MD, the MD may determine that the AD is associated with a particular identifier for which the MD has acquired an update. In some embodiments, the AD may provide an indication of its associated identifier to the MD. In other embodiments, the MD may perform a local lookup based on identification information received from the AD to determine the associated identifier.

At block 435, the update stored locally at block 425 may be provided to the AD. The update may be implemented as appropriately on the AD or by the AD. For instance, software or firmware of the AD may be updated or replaced with the update provided at block 435. Other data may also be updated, such as defined instructions, waypoints, flight plans, operating rules, maps, operation parameters, or any other information that may be transmitted digitally.

Figure 5:
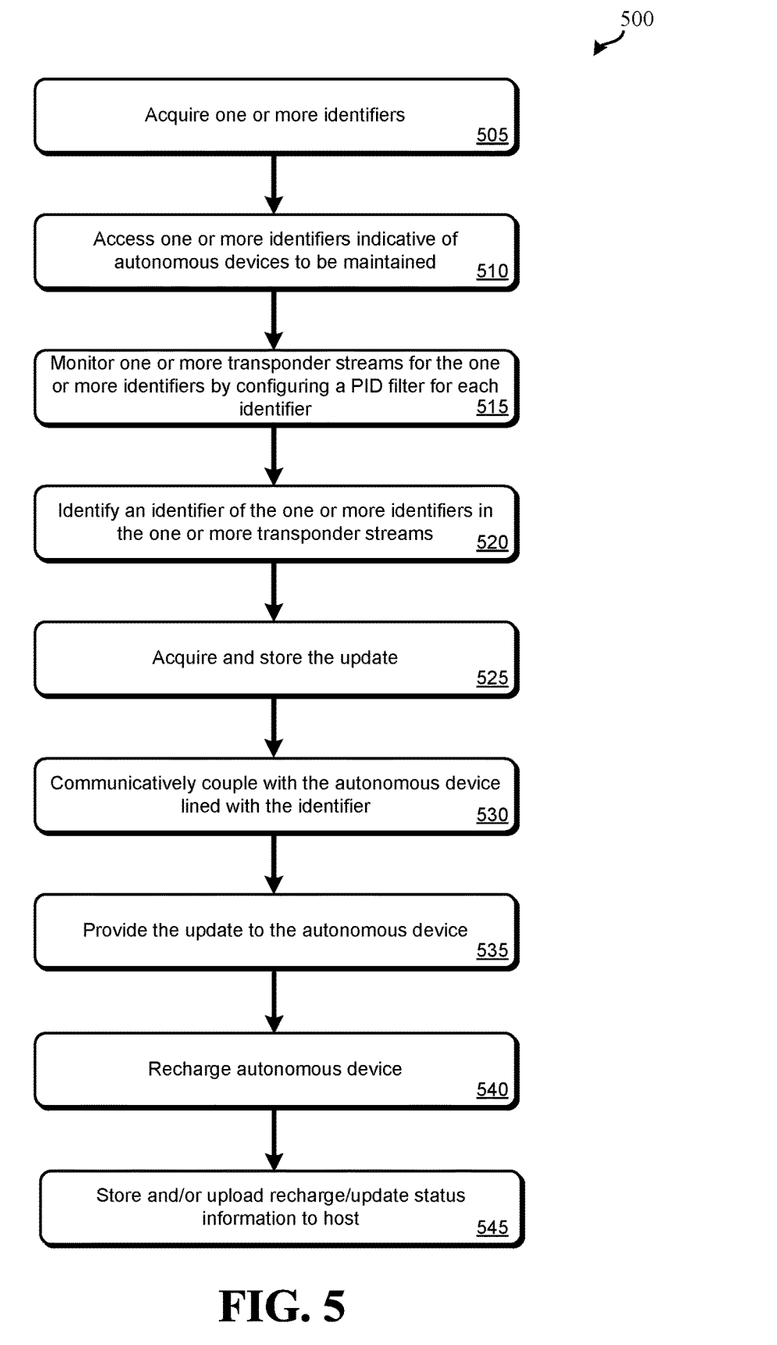
FIG. 5 illustrates another embodiment of a method for updating software of autonomous device using a network-independent maintenance device.

FIG. 5 illustrates another embodiment of a method for updating software of autonomous devices using a network-independent maintenance device. Method 500 may be performed using the systems and devices of FIGS. 1 through 3. Specifically, each block of method 500 may be performed by an MD, such as MD 200 of FIG. 2 that is functioning as part of a system, such as system 100 of FIG. 1. Method 500 may represent a more detailed embodiment of method 400; various blocks of method 400 may be replaced with blocks of method 500 and various blocks of method 500 may be replaced with blocks of method 400.

At block 505, one or more identifiers may be acquired by the MD. These identifiers may be stored locally by the MD using a storage device. Identifiers may be acquired in multiple ways by the MD. In some embodiments, a user may directly provide an identifier or information which the MD can associate with the identifier as user input to a user input interface of the MD. Another way an MD may acquire one or more identifiers is by an AD initially communicatively pairing with the MD. This initial communicative pairing may trigger the MD to store an identifier associated with the AD in AD identifier database of the MD. Another way an MD may acquire an identifier is through an instruction transmitted to the MD by the satellite-based update host. The instruction may be specifically addressed to the particular MD and the instruction may indicate the identifier which is to be monitored for by the MD. A similar instruction may be used for indicating an identifier for which the MD no longer needs to monitor.

Further, it should be understood that additional identifiers may be acquired by the MD at various times. For instance, for a time, the MD may only have a single identifier for which it is monitoring one or more transponder streams and acquiring updates. At a later time, a second AD may have an associated identifier acquired by the MD and for which updates are then acquired by the MD and, possibly, later provided to the associated second AD.

At block 510, the one or more identifiers that are indicative of one or more ADs that are maintained by an MD and were acquired at block 505 may be accessed by the MD. The identifiers accessed at block 510 may be used to determine what data from one or more update data streams received from a satellite may be stored by the MD and what data should be discarded.

At block 515, one or more transponder streams may be monitored by the MD for the one or more identifiers accessed at block 510. Block 515 can include monitoring the transponder streams for an update software package, update firmware package, or other update data that is broadcast and is associated with one of the identifiers accessed at block 510. The monitoring of the one or more transponder streams at block 515 may be performed using one or more PID filters, as detailed in relation to MD 200. Each PID filter may monitor a transponder stream for a particular pack identifier.

At block 520, when a PID present in a received transponder stream is determined to match or otherwise be associated with the PID of a PID filter being enforced by the MD, the packetized data associated with PID from the transponder stream may be acquired and stored at block 525. Other data that is not associated with a PID filter according to which the transponder stream is monitored may be discarded or otherwise ignored.

At some time later, the AD may communicatively couple with the MD at which the update was acquired and stored at block 525. The amount of time that may elapse between blocks 525 and 530 may vary significantly. For example, some ADs may only visit or reside at their respective MD once per day, once per week, or once per month. Other ADs may frequently visit or reside at their associated MD; for example, an AD may only typically be away from its MD for periods of several minutes. At block 530, when the AD communicatively couples with the MD, the MD may determine that the AD is associated with a particular identifier for which the MD has acquired an update. In some embodiments, the AD may provide an indication of its associated identifier to the MD. In other embodiments, the MD may perform a local lookup based on identification information received from the AD to determine the associated identifier.

At block 535, the update stored locally at block 525 may be provided to the AD. The update may be implemented as appropriately on the AD or by the AD. For instance, software or firmware of the AD may be updated or replaced with the update provided at block 535. Other data may also be updated, such as defined instructions, waypoints, flight plans, operating rules, maps, operation parameters, or any other information that may be transmitted digitally.

At block 540, which may occur while blocks 530 and 535 are being performed, the AD may be recharged. This may include transmitting power from one or more batteries of the MD to one or more batteries of the AD. If the MD is connected with a grid-based power source, power from the grid-based power source may be used to recharge the batteries of the AD without intermediate storage by one or more batteries of the MD. In some embodiments, the AD, when functioning properly, can power itself, such as via a self-contained power source (e.g., solar panels). If this power source becomes damaged or otherwise cannot sufficiently power the AD, the AD may be able to charge from the MD. An indication of this inability to power itself may be transmitted as part of status information about the AD transmitted to the MD and/or the satellite-based update host.

At block 545, the MD may store information relating to the update and the AD. For instance, the MD may store information regarding when the update was received, when the update was transmitted to the AD, whether the AD successfully completed installation or implementation of the update, whether the AD was recharged, when the AD reached recharge, how long the recharge of the AD took to perform, and/or other status or health information of the AD. Further, at block 545, this information may be transmitted to the satellite-based update host by either the AD or the MD. In some instances, the MD may not have any communication path to transmit information to the satellite-based update host. In some embodiments, the MD may be able to transmit a small amount of information via a satellite uplink to the satellite-based update host, thus allowing information such as that detailed in block 545 to be transmitted via satellite to the satellite-based update host. In other embodiments, the AD may be able to transmit data to the satellite-based update host via some other communication link. In still other embodiments, the information of block 545 may be maintained locally by the AD and/or the MD may be retrieved at another time, such as by a user visiting the MD in person.

Figure 6:
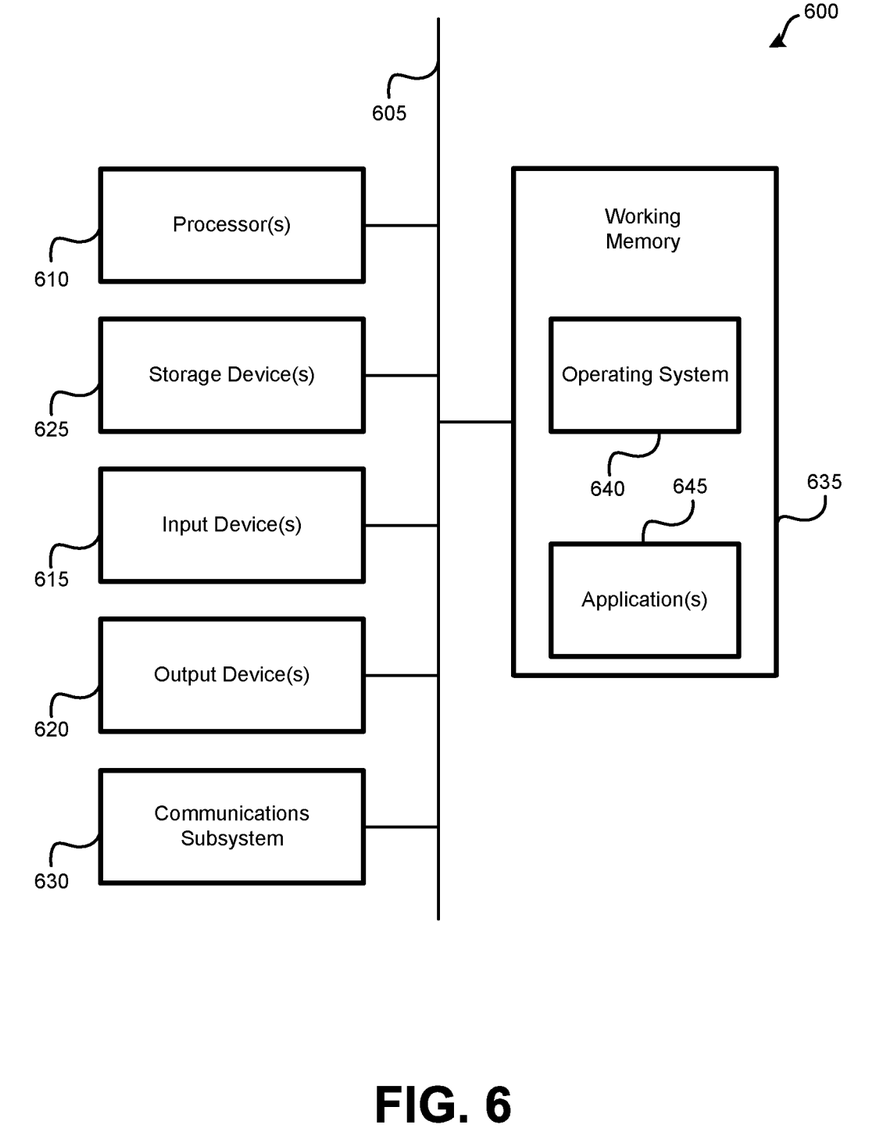
FIG. 6 illustrates an embodiment of computerized componentry that can be incorporated as part of the network-independent maintenance device.

FIG. 6 illustrates an embodiment of a computer system 600 that can be incorporated as part of the ADs, MDs, and satellite-based update host systems detailed herein. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a touchscreen, keyboard, remote control, and/or the like; and one or more output devices 620, which can include without limitation a display device, a printer, etc.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a flash memory stick), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A network-independent maintenance device for servicing autonomous devices, comprising:
    a housing;
    a tuner electrically connected with a satellite antenna, the tuner being internal to the housing and the satellite antenna being external to the housing, wherein the tuner receives a unidirectional broadcast of a transponder stream of data from a satellite, the unidirectional broadcast of the transponder stream comprising a plurality of updates for a plurality of autonomous devices broadcast to a plurality of network-independent maintenance devices that comprises the network-independent maintenance device;
a communication interface located within the housing;
one or more processors located within the housing; and
one or more memories located within the housing and communicatively coupled with and readable by the one or more processors and having stored therein processor-readable instructions which, when executed by the one or more processors, cause the one or more processors to:
retrieve from the one or more memories, an identifier indicative of an autonomous device maintained by the network-independent maintenance device, wherein the network-independent maintenance device is a physically separate device from the autonomous device;
monitor the transponder stream of data received via the tuner for the identifier indicative of the autonomous device;
discard at least some updates of the plurality of updates for the plurality of autonomous devices received as part of the transponder stream of data from the satellite;
acquire an update of the plurality of updates, wherein:
the update is linked with the identifier and is from the transponder stream of data received via the tuner; and
the update is acquired at least partially based on the identifier being identified within the transponder stream of data received via the tuner;
cause the acquired update to be stored by the one or more memories at least until the autonomous device communicatively pairs with the network-independent maintenance device;
communicatively pair with the autonomous device using the communication interface; and
in response to having acquired the update linked with the identifier from the transponder stream of data and the autonomous device being communicatively paired with the network-independent maintenance device, transfer the acquired update to the autonomous device.

2. The network-independent maintenance device for servicing autonomous devices of claim 1, further comprising:
a charging interface that is configured to provide power to recharge a battery of the autonomous device while the autonomous device is communicatively paired with the network-independent maintenance device.

3. The network-independent maintenance device for servicing autonomous devices of claim 1, wherein the transponder stream of data comprises a stream of a plurality of updates for a plurality of autonomous devices.

4. The network-independent maintenance device for servicing autonomous devices of claim 1, wherein the processor-readable instructions, when executed, further cause the one or more processors to cause transmission of an indication of the update having been transferred to the autonomous device to be transmitted to a remote computer system, wherein the indication indicates: the acquired update and the autonomous device.

5. The network-independent maintenance device for servicing autonomous devices of claim 1, wherein the processor-readable instructions that, when executed, cause the one or more processors to monitor the transponder stream of data received via the tuner for the identifier indicative of the autonomous device comprise processor-readable instructions which, when executed, cause the one or more processors to monitor the transponder stream of data for a plurality of identifiers, comprising the identifier, wherein each identifier of the plurality of identifiers is associated with a different autonomous device maintained by the network-independent maintenance device.

6. The network-independent maintenance device for servicing autonomous devices of claim 5, wherein each identifier of the plurality of identifiers is associated with a type, make, and model of autonomous device.

7. The network-independent maintenance device for servicing autonomous devices of claim 1, wherein the processor-readable instructions, when executed, further cause the one or more processors to:
receive an instruction addressed to the network-independent maintenance device via the tuner, wherein the instruction provides a second identifier indicative of a second autonomous device maintained by the network-independent maintenance device;
store the second identifier to the one or more memories; and
begin monitoring the transponder stream of data for the second identifier.

8. The network-independent maintenance device for servicing autonomous devices of claim 1, wherein the processor-readable instructions, when executed, further cause the one or more processors to:
communicatively pair with a second autonomous device using the communication interface, wherein communicatively pairing with the second autonomous device comprises the second autonomous device providing a second identifier to the network-independent maintenance device; and
in response to receiving the second identifier from the second autonomous device:
store the second identifier to the one or more memories; and
begin monitoring the transponder stream of data for the second identifier.

9. The network-independent maintenance device for servicing autonomous devices of claim 1, further comprising:
a battery and a solar panel, wherein the solar panel provides electricity to the battery and the battery provides power to charge the autonomous device and acquire the update via the tuner.

10. A method for servicing an autonomous device, the method comprising:
retrieving, by a network-independent maintenance device, an identifier indicative of the autonomous device maintained by the network-independent maintenance device;
monitoring, by the network-independent maintenance device using a tuner, a transponder stream for the identifier indicative of the autonomous device, wherein the tuner receives a unidirectional broadcast of the transponder stream of data from a satellite, the unidirectional broadcast of the transponder stream comprising a plurality of updates for a plurality of autonomous devices broadcast to a plurality of network-independent maintenance devices that comprises the network-independent maintenance device;
discarding, by the network-independent maintenance device, at least some updates of the plurality of updates for the plurality of autonomous devices received as part of the transponder stream of data from the satellite;
acquiring, by the network-independent maintenance device, an update of the plurality of updates, wherein:

the update is linked with the identifier and is from the transponder stream received via the tuner of the network-independent maintenance device; and the update is acquired at least partially based on the identifier being identified within the transponder stream of data received via the tuner;

causing, by the network-independent maintenance device, the acquired update to be stored locally in a memory at least until the autonomous device communicatively pairs with the network-independent maintenance device;

communicatively pairing, between the network-independent maintenance device and the autonomous device; and in response to having acquired the update linked with the identifier from the transponder stream and the autonomous device being communicatively paired with the network-independent maintenance device, transferring, by the network-independent maintenance device, the acquired update to the autonomous device.

11. The method for servicing the autonomous device of claim 10, the method further comprising: while the network-independent maintenance device and the autonomous device are communicatively paired, charging, by the network-independent maintenance device, a battery of the autonomous device.

12. The method for servicing the autonomous device of claim 10, wherein acquiring the update linked with the identifier from the transponder stream received by the tuner comprises: filtering the update from the plurality of updates broadcast for the plurality of autonomous devices.

13. The method for servicing the autonomous device of claim 10, the method further comprising:
transmitting, by the network-independent maintenance device to a remote computer system, an indication of the update having been transferred to the autonomous device, wherein the indication indicates: the acquired update and the autonomous device.

14. The method for servicing the autonomous device of claim 10, wherein monitoring the transponder stream comprising: monitoring the transponder stream for a plurality of identifiers comprising the identifier, wherein each identifier of the plurality of identifiers is associated with a different autonomous device maintained by the network-independent maintenance device.

15. The method for servicing the autonomous device of claim 10, the method further comprising:
receiving, by the network-independent maintenance device, an instruction addressed to the network-independent maintenance device via the tuner, wherein the instruction provides a second identifier indicative of a second autonomous device maintained by the network-independent maintenance device;
storing, by the network-independent maintenance device, the second identifier to the local memory; and
initiating, by the network-independent maintenance device, monitoring of the transponder stream for the second identifier.

16. The method for servicing the autonomous device of claim 10, the method further comprising:
communicatively pairing the network-independent maintenance device with a second autonomous device, wherein communicatively pairing with the second autonomous device comprises the second autonomous device providing a second identifier to the network-independent maintenance device; and in response to receiving the second identifier from the second autonomous device:
storing the second identifier by the network-independent maintenance device; and
initiating monitoring of the transponder stream for the second identifier.

17. A non-transitory processor-readable medium for execution by a network-independent maintenance device, comprising processor-readable instructions that cause one or more processors to:
receive, via a tuner, an identifier indicative of an autonomous device maintained by the network-independent maintenance device, wherein the tuner receives a unidirectional broadcast of a transponder stream of data from a satellite, the unidirectional broadcast of the transponder stream comprising a plurality of updates for a plurality of autonomous devices broadcast to a plurality of network-independent maintenance devices that comprises the network-independent maintenance device;
monitor the transponder stream received via a tuner for the identifier indicative of the autonomous device;
discard at least some updates of the plurality of updates for the plurality of autonomous devices received as part of the transponder stream of data from the satellite;
acquire an update of the plurality of updates, wherein:
the update is linked with the identifier and is from the transponder stream received via the tuner; and
the update is acquired at least partially based on the identifier being identified within the transponder stream of data received via the tuner;
cause the acquired update to be stored by a local memory at least until the autonomous device communicatively pairs with the network-independent maintenance device;
communicatively pair with an autonomous device; and
in response to having acquired the update linked with the identifier from the transponder stream and the autonomous device being communicatively paired with the network-independent maintenance device, transfer the acquired update to the autonomous device.

18. The non-transitory processor-readable medium of claim 17, wherein the processor-readable instructions further cause the one or more processors to: cause transmission of an indication of the update having been transferred to the autonomous device to a remote computer system, wherein the indication indicates: the acquired update and the autonomous device.

19. The non-transitory processor-readable medium of claim 17, wherein each identifier of a plurality of identifiers associated with the plurality of updates is associated with a type, make, and model of autonomous device.

20. The non-transitory processor-readable medium of claim 17, wherein the processor-readable instructions further cause the one or more processors to:
receive an instruction addressed to the network-independent maintenance device via the tuner, wherein the instruction provides a second identifier indicative of a second autonomous device maintained by the network-independent maintenance device;
store the second identifier to the local memory; and
begin monitoring the transponder stream for the second identifier.

* * * * *